J. MALORY.
Setting Sugar Kettles.
No. 19. A. I. Patented Dec. 10, 1838.
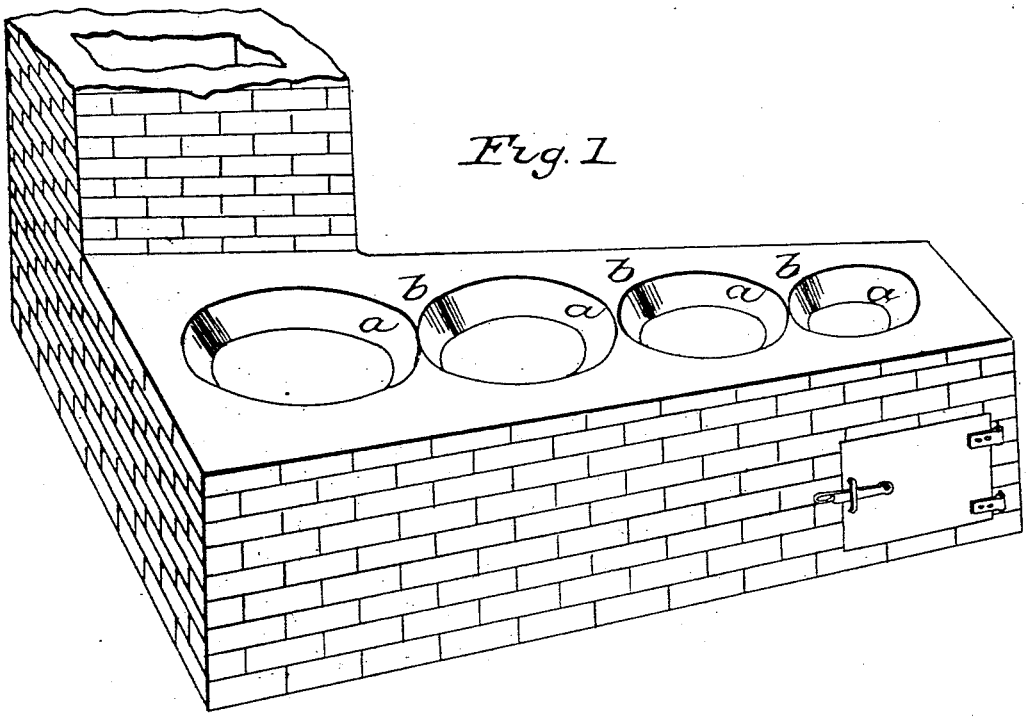
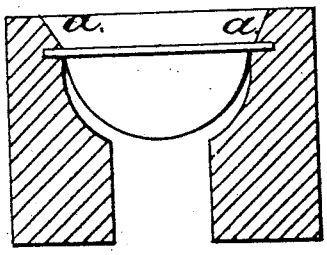
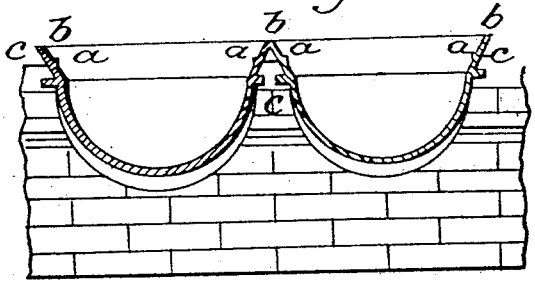
N. PETERS, Photo-Lithographer, Washington, D. C.

UNITED STATES PATENT OFFICE.

JAMES MALORY, OF NEW ORLEANS, LOUISIANA.

IMPROVEMENT IN MODES OF SETTING SUGAR-KETTLES.

Specification forming part of Letters Patent No. 936, dated September 20, 1838; Additional Improvement No. 19, dated December 11, 1838.

*To all whom it may concern:*

Be it known that I, JAMES MALORY, of the city of New Orleans, in the State of Louisiana, did on the 20th day of September, 1838, obtain Letters Patent of the United States for an Improved Mode of Setting Sugar-Kettles; that I have since made an improvement thereon which I am desirous of adding to the said Letters Patent; and I do hereby declare that the following is a full and correct description of my said addition and improvement.

Figure 1 in the accompanying drawings represents four kettles formed and set in accordance with my improvement; Fig. 2, a vertical and longitudinal section through two of them, and Fig. 3 a cross-section through the stack, showing one of the kettles.

In the improved form the upper edge, *a a*, of each kettle is to be made to flare out, so as to have the brim high enough to make a sloping brim high enough without the use of tiling or masonry, which is so liable to get out of order, and is a source of much vexation and expense as ordinarily used. The sloped brims of these kettles meet together, as at *b b*, and to secure them in place they are connected by means of bolts and nuts *c c*, which are so formed as to be flush with the surface of the kettle, and are consequently out of the way. In setting these kettles I intend, if necessary, to terminate the flange, which is immediately under the sloping brim, just where the kettles come together, so that arches may be sprung from one pier to the other between them. The position of the flange, which would otherwise be exposed to the immediate action of the fire, is thus omitted, where they might otherwise burn out and expose the sloping brim to injury in the same way.

What I claim as my additional improvement is—

The forming of sugar-kettles with sloping brims so as to effect the purpose and be a substitute for the masonry hitherto used around the brims of such kettles, the same being constructed substantially as set forth.

JAMES MALORY.

Witnesses:

LINTON THORN,

B. K. MORSELL.